(12) United States Patent
Hsu (10) Patent No.: US 9,268,372 B1
(45) Date of Patent: Feb. 23, 2016

(54) MULTI-JOINT SYNCHRONOUS ROTARY AXLE STRUCTURE

(71) Applicant: FIRST DOME CORPORATION, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 14/501,275

(22) Filed: Sep. 30, 2014

(30) Foreign Application Priority Data

Aug. 15, 2014 (TW) .............................. 103128200 A (51) Int. Cl.
  *G06F 1/16* (2006.01)
  *E05D 11/08* (2006.01)
  *E05D 3/06* (2006.01)
  *E05D 7/00* (2006.01)

(52) U.S. Cl.
  CPC ............... *G06F 1/1681* (2013.01); *E05D 3/06* (2013.01); *E05D 7/009* (2013.01); *E05D 11/082* (2013.01); *Y10T 16/541* (2015.01)

(58) Field of Classification Search
  CPC ............ Y10T 16/541; Y10T 16/54038; Y10T 16/547; Y10T 16/5474; E05D 3/06; E05D 3/122; E05D 11/082; E05D 7/009; E05Y 2900/606; G06F 1/1681; G06F 1/1616; G06F 1/1618; H05K 5/0226; H04M 1/0216; H04M 1/022

USPC ..................... 16/366, 354, 342, 368; 49/358; 361/679.27, 679.06; 379/433.13; 455/575.3

See application file for complete search history.

(56) References Cited

U.S. PATENT DOCUMENTS

| | | | |
|---|---|---|---|
| 6,223,393 B1 * | 5/2001 | Knopf ................... | G06F 1/1681 16/366 |
| 7,805,810 B2 * | 10/2010 | Hoffman ................. | E05D 3/127 16/354 |
| 8,769,772 B2 * | 7/2014 | Griffin .................. | G06F 1/1626 16/354 |
| 8,959,719 B2 * | 2/2015 | Hsu ....................... | G06F 1/1681 16/303 |
| 9,021,657 B2 * | 5/2015 | Park ...................... | H05K 5/0226 16/354 |
| 2009/0070961 A1 * | 3/2009 | Chung ................... | E05D 3/122 16/354 |
| 2011/0000136 A1 * | 1/2011 | Brun ....................... | E05D 3/06 49/358 |

* cited by examiner

*Primary Examiner* — William Miller
(74) *Attorney, Agent, or Firm* — Rosenberg, Klein & Lee (57) ABSTRACT

A multi-joint synchronous rotary axle structure includes a middle shaft and two parallel side shafts at two sides of the middle shaft. A first synchronous actuating assembly and a second synchronous actuating assembly are provided at two opposite positions of the middle shaft and the side shafts, which are connected in a reverse link relationship. The two side shafts can be rotated about the middle shaft to generate a synchronous reverse turning. A two-way shaft plate is provided between the middle shaft and each of the side shafts to provide the torsion of tuning so as to form a compact multi-joint synchronous rotary axle structure.

27 Claims, 8 Drawing Sheets

MULTI-JOINT SYNCHRONOUS ROTARY AXLE STRUCTURE

BACKGROUND OF THE INVENTION

1. Field of the Invention

The present invention relates to a multi-joint synchronous rotary axle structure, and more particularly to a rotary axle structure which can be mounted to two opposing foldable apparatuses for synchronous rotation and operation and has a more compact structure.

2. Description of the Prior Art

Nowadays, an electronic apparatus usually comprises a base as a system end and an upper cover as a display. The base and the upper cover are connected through a pivotal device. The upper cover can be opened upward to be in a use state with the pivotal device as the axle of operation, or the upper cover can be closed to the upper surface of the base to be in a closed state. The pivotal device is as the axle of the electronic apparatus, so the design of the structure must consider whether the operation relative to the base is smooth or not. When the upper cover is opened to a desired angle (for example, the screen of the notebook is opened to 135 degrees), the pivotal device must have enough support force to position the screen at the operation angle.

In general, the pivotal device comprises a connection member having a spindle and another connection member having a spindle sleeve. One connection member is mounted to the upper cover, and the other connection member is mounted to the base. The spindle and the spindle sleeve are connected with each other. To consider the support strength and the smoothness of operation, the two connection members having the spindle and the spindle sleeve are disposed at two opposing edges of the upper cover and the base of the electronic apparatus (such as a notebook).

This conventional pivotal device is arranged in the form of one set. When the upper cover of the electronic apparatus is opened, the coordination of two pivotal devices is not perfect because the two pivotal devices don't have the same spindle when being turned. Besides, the rotation degree of the two pivotal devices is also limited, so the electronic apparatus cannot be opened or closed smoothly.

Due to the functional limit of the aforesaid pivotal device and the demand for a larger angle of turning, a pivotal device not having the same spindle is developed and mounted between the upper cover and the base of the electronic apparatus. The coordination of the two spindles of the pivotal device cannot be controlled so the electronic apparatus cannot be closed or opened accurately and smoothly and the demand for a light operation cannot be achieved.

Figure 1:
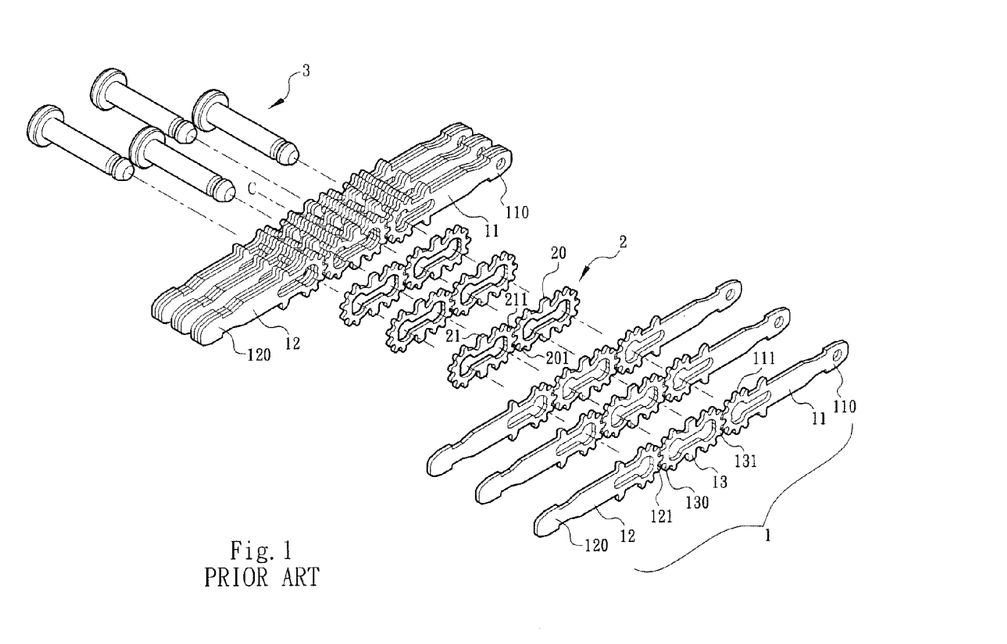
FIG. 1 is an exploded view of a conventional multi-joint rotary axle structure.
Figure 2:
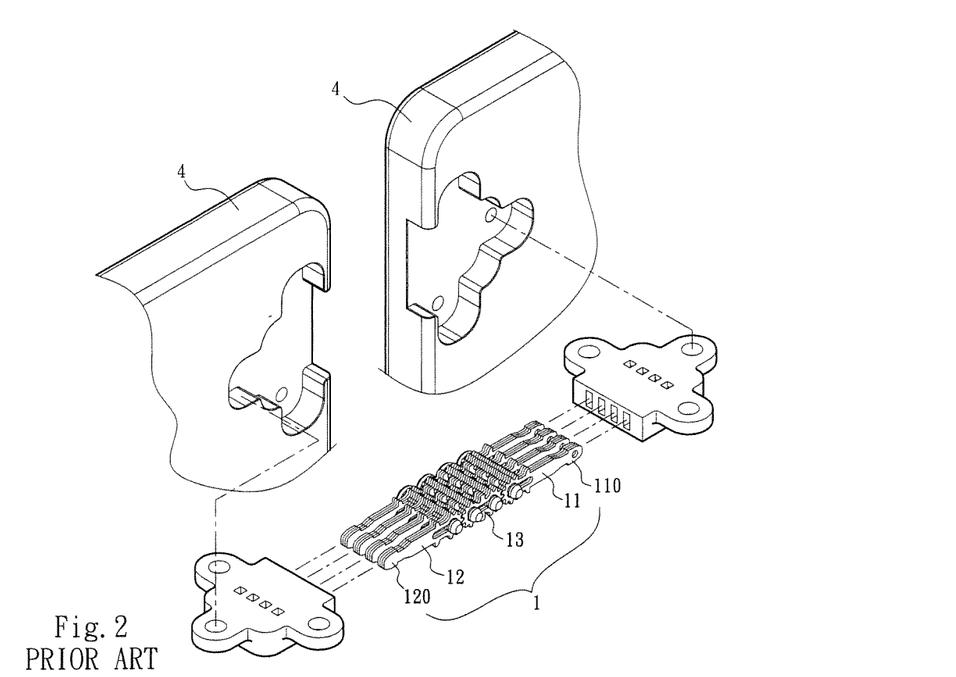
FIG. 2 is a perspective schematic view of the conventional multi-joint rotary axle structure applied to a foldable object.

In order to improve the aforesaid shortcomings, a prior invention is developed as shown in FIG. 1 and FIG. 2. This device comprises at least one driving joint assembly 1 and at least one driven joint assembly 2. The driving joint assembly 1 comprises two opposing first and second joint plates 11, 12 and a middle link plate assembly 13 between the first and second joint plates 11, 12. The two opposing first and second joint plates 11, 12 have synchronous actuating portion 111, 121 at respective inner ends thereof. The middle link plate assembly 13 has two connecting actuating portions at the two ends thereof to mate with the synchronous actuating portions 111, 121 of the first joint plate 11 and the second joint plate 12. The driven joint assembly 2 is disposed between the first and second joint plates 11, 12 of the driving joint assembly 1. The driven joint assembly 2 comprises at least two driven plates 20, 21 which have synchronous actuating portions at respective inner ends thereof to mate with each other. The inner ends of the opposing joint plates 11, 12 correspond to the outer ends of the driven plates 20, 21 and are connected with axle pins 3. The outer ends of each middle link plate of the middle link plate assembly 13 correspond to the inner ends of the driven plates 20, 21 and are connected with axle pins. Besides, the outer ends of the opposing joint plates 11, 12 have insertion end heads 110, 120 for connecting with a foldable object 4 easily. Furthermore, the driving joint assembly 1 and the driven joint assembly 2 are arranged side by side, and the middle link plate assembly 13 between the opposing joint plates 11, 21 and the driven joint assembly 2 are connected through the axle pins to form a multi-joint synchronous rotary axle structure. Each joint plate of the driving joint assembly can be rotated freely through multiple rotation centers.

However, the aforesaid multi-joint synchronous rotary axle structure is composed of a plurality of toothed plates to achieve better transmission and the required torsion to support the turning angle. Because the parts are too many, the quality of the product can't be controlled easily. It is difficult to control the tightness of the plates. Sometimes, the lubricant may leak out. Accordingly, the inventor of the present invention has devoted himself based on his many years of practical experiences to solve these problems.

SUMMARY OF THE INVENTION

The primary object of the present invention is to provide a multi-joint synchronous rotary axle structure which comprises a middle shaft and two parallel side shafts at two sides of the middle shaft. A first synchronous actuating assembly and a second synchronous actuating assembly are provided at two opposite positions of the middle shaft and the side shafts, which are connected in a reverse link relationship. The two side shafts can be rotated about the middle shaft to generate a synchronous reverse turning.

A further object of the present invention is to provide a multi-joint synchronous rotary axle structure which comprises a two-way shaft plate disposed between the middle shaft and each of the side shafts for providing the torsion of tuning of the shafts so as to simplify the torsion supply device between the shafts.

According to the aforesaid embodiment, each of the first and second synchronous actuating assemblies of the present invention is composed of a synchronous actuating member and a corresponding link member. Each synchronous actuating member has an actuating end and a fixing end. The actuating end is pivotally connected to one of the side shafts. The actuating end and a link end of the link member form a synchronous connection. The link end of the link member is pivotally connected to the middle shaft. The link member further has a driven end fixed to the other side shaft. The first synchronous actuating assembly and the second synchronous actuating assembly are disposed at two opposite positions of the middle shaft and the side shafts, which are connected in a reverse link relationship relative to the middle shaft. The two side shafts can be rotated about the middle shaft to generate a synchronous reverse turning.

According to the aforesaid embodiment, between the middle shaft and the two side shafts is provided with a two-way shaft plate to provide a torsion balance of the synchronous actuation of the two side shafts. Between the middle shaft and the two side shafts is further provided with a one-way shaft plate with a fixing plate to overcome the torsion of the relative turning of the middle shaft and the two side shafts for supporting the turning angle of the shafts.

DETAILED DESCRIPTION OF THE PREFERRED EMBODIMENTS

Embodiments of the present invention will now be described, by way of example only, with reference to the accompanying drawings.

Figure 3:
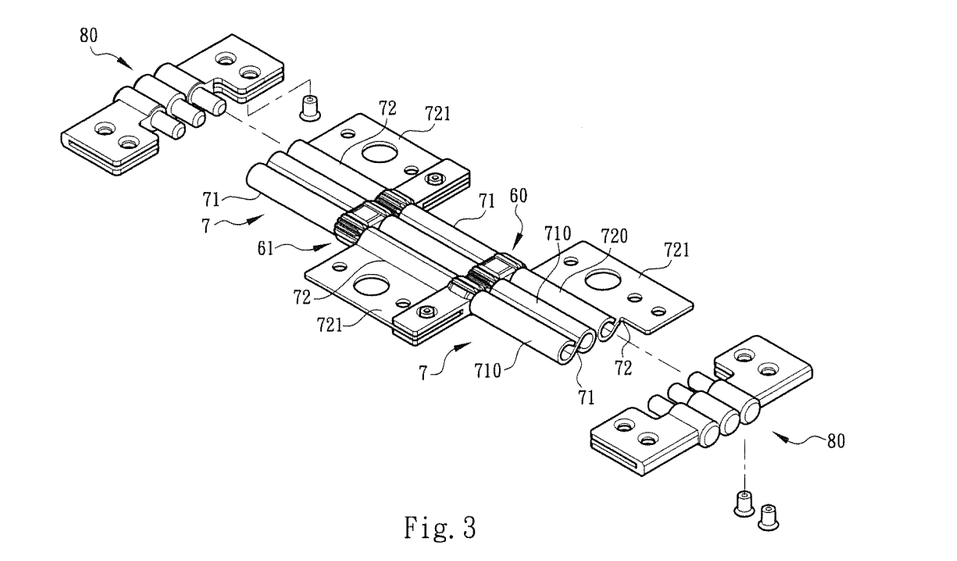
FIG. 3 is an exploded view according to a preferred embodiment of the present invention.
Figure 4:
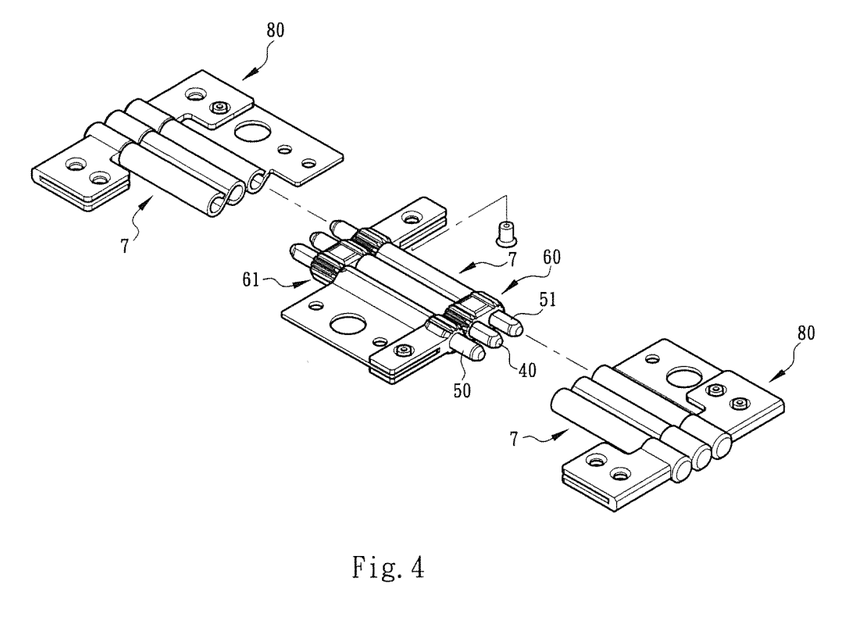
FIG. 4 is another exploded view of the embodiment of FIG. 3.
Figure 5:
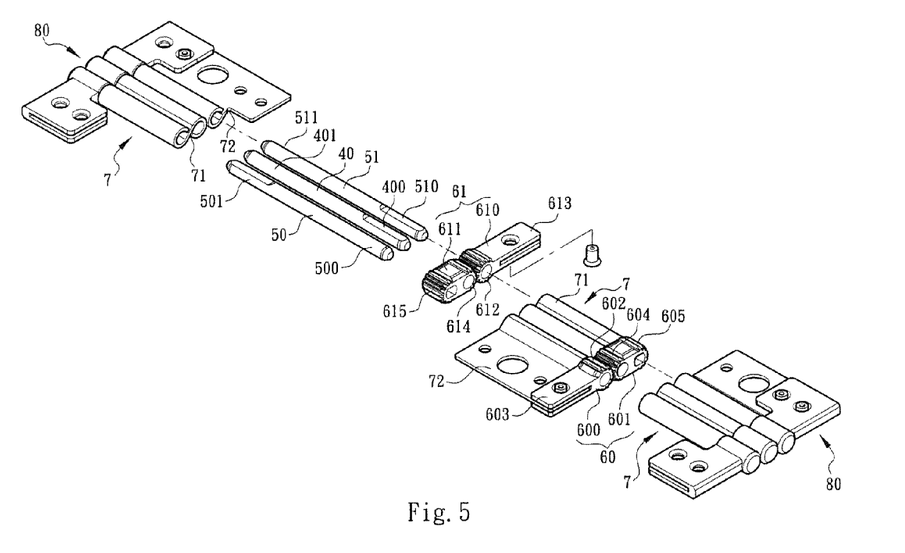
FIG. 5 is a partial exploded view showing the synchronous actuating assembly of the embodiment of FIG. 3.
Figure 6:
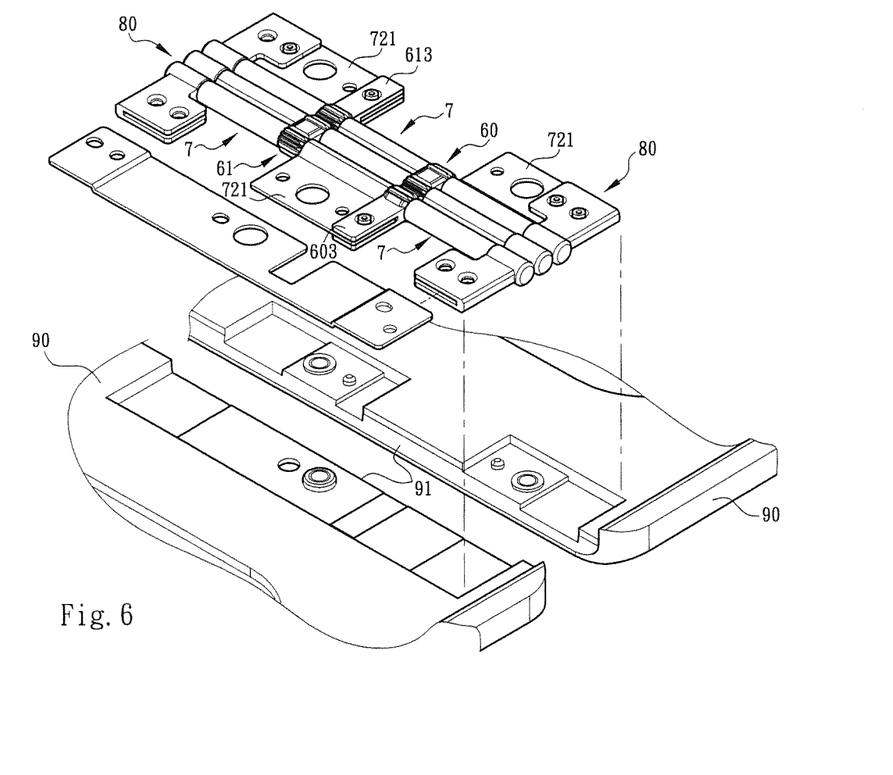
FIG. 6 is an exploded view of the present invention mounted to a foldable object.

Referring to FIG. 3 to FIG. 5, the present invention comprises a middle shaft 40 and two side shafts which are disposed at two sides of the middle shaft 40 and parallel to each other. The two side shafts are a first side shaft 50 and a second side shaft 51. The middle shaft 40, the first side shaft 50, and the second side shaft 51 have a first position 400, 500, 510 and a second position 401, 501, 511, respectively. A first synchronous actuating assembly 60 and a second synchronous actuating assembly 61 are provided at the first position 400, 500, 510 and the second position 401, 501, 511 of the middle shaft 40, the first side shaft 50, and the second side shaft 51. The connection of the first synchronous actuating assembly 60 and the second synchronous actuating assembly 61 relative to the middle shaft 40, the first side shaft 50 and the second side shaft 51 can be in opposite directions. As shown in the drawings, the first synchronous actuating assembly 60 is composed of a first synchronous actuating member 600 and a first link member 601. The second synchronous actuating assembly 61 is composed of a second synchronous actuating member 610 and a second link member 611. The first synchronous actuating member 600 has an actuating end 602. The actuating end 602 is pivotally connected to the first position 500 of the first side shaft 50. The first synchronous actuating member 600 further has a fixing end 603 extending outward from the actuating end 602. The first link member 601 has a link end 604. The link end 604 is pivotally connected to the first position 400 of the middle shaft 40. The first link member 601 further has a driven end 605 fixed at the first position 510 of the second side shaft 51. The second synchronous actuating member 610 has an actuating end 612. The actuating end 612 is pivotally connected to the second position 511 of the second side shaft 51. The second synchronous actuating member 610 further has a fixing end 613 extending outward from the actuating end 612. The second link member 611 has a link end 614. The link end 614 is pivotally connected to the second position 401 of the middle shaft 40. The second link member 611 further has a driven end 615 fixed at the second position 501 of the first side shaft 50. The actuating end 602 of the first synchronous actuating member 600 and the link end 604 of the first link member 601 form a synchronous connection. The actuating end 612 of the second synchronous actuating member 610 and the link end 614 of the second link member 611 form a synchronous connection. The synchronous connection can be achieved by teeth, corresponding frictional surfaces, or other means to be linked synchronously.

Figure 7:
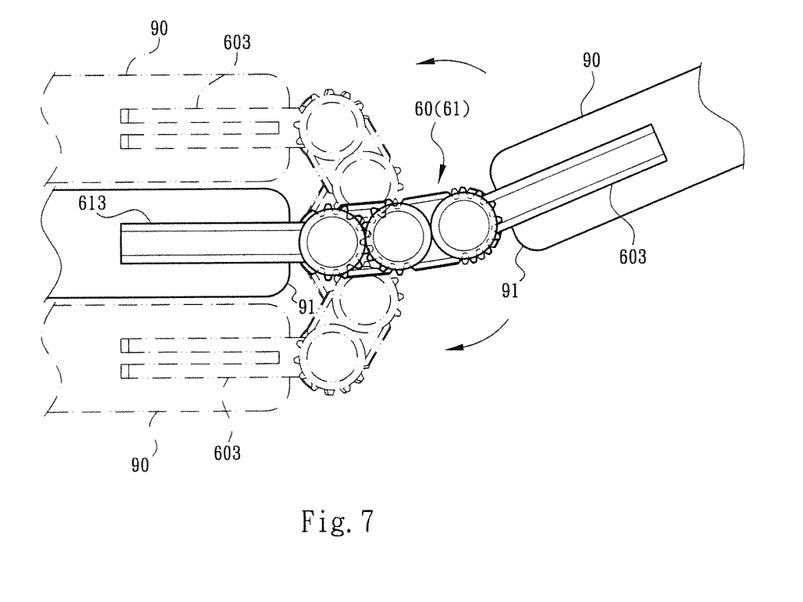
FIG. 7 is a schematic view showing operation of the present invention mounted to the foldable object.
Figure 8:
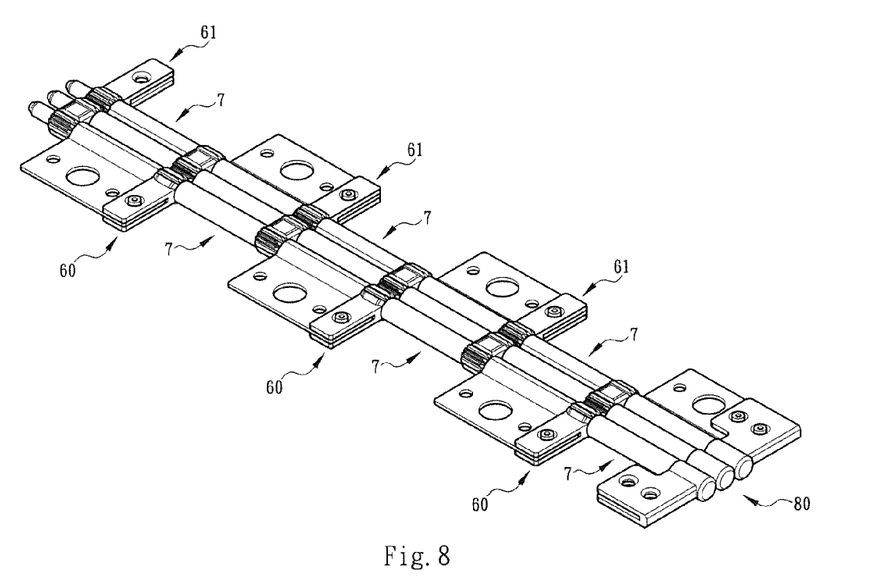
FIG. 8 is a perspective view showing a plurality of connected multi-joint synchronous rotary axle structures

Through the aforesaid structure, the user can operate the first synchronous actuating assembly 60 or the second synchronous actuating assembly 61 relative to the middle shaft 40. If the user operates the actuating end 602 of the first synchronous actuating member 600, the actuating end 602 will be rotated around the outer periphery of the link end 604 of the first link member 601 (namely, relative to the middle shaft 40). This operation will actuate the first side shaft 50 to rotate relative to the middle shaft 40 simultaneously, such that the driven end 615 of the second link member 611 is linked to displace. Thus, the link end 614 of the second link member 611 is rotated relative to the middle shaft 40. This rotation brings the second synchronous actuating member 610 to rotate reversely relative to the first synchronous actuating member 600. Similarly, if the user operates the second synchronous actuating member 610, according to the aforesaid link relationship, the first synchronous actuating member 600 will be rotated reversely relative to the second synchronous actuating member 610. Accordingly, the present invention is able to form a multi-joint rotary axle structure which comprises at least three shafts, referring to FIG. 7.

For the rotation angle between the middle shaft 40, the first side shaft 50 and the second side shaft 51 to have enough torsion, the present invention further comprises a torsion elastic plate assembly 7 disposed between two synchronous actuating assembles (such as between the first synchronous actuating assembly 60 and the second synchronous actuating assembly 61). The torsion elastic plate assembly 7 comprises a two-way shaft plate 71 and/or a one-way shaft plate 72. The two-way shaft plate 71 comprises a pair of elastic sleeves 710 to wrap the middle shaft 40 and one of the first side shaft 50 and the second side shaft 51 for providing the rotation torsion between either of the side shafts and the middle shaft 40. The one-way shaft plate 72 comprises an elastic sleeve 720 to wrap one of the first side shaft 50 and the second side shaft 51, and a fixing plate 721 extends from the elastic sleeve 720 to be secured to the fixing end 603, 613 of the first synchronous actuating member 600 or the second synchronous actuating member 610 to achieve a synchronous operation and provide the torsion of the relative rotation between the synchronous actuating member 600, 610 and the corresponding side shaft 50, 51.

Referring to FIG. 3 to FIG. 8, the number and length of the multi-joint rotary axle structure of the present invention can be adjusted according to the demand of the object. After assembled, two outer ends of the multi-joint rotary axle are coupled with respective end fittings 80. The fixing ends 603, 613 of the synchronous actuating members or/and the fixing plate 721 of the multi-joint rotary axle can be coupled to opposite connecting sides 91 of two foldable members 90 of the aforesaid electronic object to provide a foldable effect.

Compared to the conventional multi-joint rotary axle, the multi-joint synchronous rotary axle structure of the present invention has the following advantages.

1. The parts of the present invention are decreased greatly to enhance the capacity and lower the cost.

2. The present invention uses at least three shafts to achieve a full turning. Compared to the conventional structure having at least four shafts, the present invention has less turning folding thickness to provide a compact condition for the object.

3. The present invention does not need to use foldable elastic plates to provide the torsion of the turning shafts. This not only simplifies the number of the parts but also prevents lubricant from leaking.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A multi-joint synchronous rotary axle structure, comprising a middle shaft, a first side shaft and a second side shaft wherein the side shafts are parallel to two sides of the middle shaft, the middle shaft, the first side shaft and the second side shaft having a first position and a second position respectively, a first synchronous actuating assembly and a second synchronous actuating assembly being provided at the first position and the second position; the first synchronous actuating assembly comprising a first synchronous actuating member and a first link member; the second synchronous actuating assembly comprising a second synchronous actuating member and a second link member; the first synchronous actuating member having an actuating end, the actuating end of the first synchronous actuating member being pivotally connected to the first position of the first side shaft, the first link member having a link end, the link end of the first link member being pivotally connected to the first position of the middle shaft, the first link member further having a driven end, the driven end of the first link member being fixed at the first position of the second side shaft; the second synchronous actuating member having an actuating end, the actuating end of the second synchronous actuating member being pivotally connected to the second position of the second side shaft, the second link member having a link end, the link end of the second link member being pivotally connected to the second position of the middle shaft, the second link member further having a driven end, the driven end of the second link member being fixed at the second position of the first side shaft; the actuating end of the first synchronous actuating member and the link end of the first link member forming a synchronous connection; the actuating end of the second synchronous actuating member and the link end of the second link member forming a synchronous connection.

2. The multi-joint synchronous rotary axle structure as claimed in claim 1, wherein a torsion elastic plate assembly is provided between the first synchronous actuating assembly and the second synchronous actuating assembly.

3. The multi-joint synchronous rotary axle structure as claimed in claim 2, wherein the torsion elastic plate assembly comprises a two-way shaft plate, the two-way shaft plate comprising a first elastic sleeve and a second elastic sleeve to wrap the middle shaft and one of the first side shaft and the second side shaft.

4. The multi-joint synchronous rotary axle structure as claimed in claim 2, wherein the torsion elastic plate assembly comprises a one-way shaft plate, the one-way shaft plate comprising an elastic sleeve to wrap one of the first side shaft and the second side shaft, and a fixing plate extending from the elastic sleeve.

5. The multi-joint synchronous rotary axle structure as claimed in claim 3, wherein the torsion elastic plate assembly further comprises a one-way shaft plate, the one-way shaft plate comprising a third elastic sleeve to wrap the other of the first side shaft and the second side shaft, and a fixing plate extending from the third elastic sleeve.

6. The multi-joint synchronous rotary axle structure as claimed in claim 4, wherein the fixing plate is secured to the fixing end of the first synchronous actuating member or the second synchronous actuating member.

7. The multi-joint synchronous rotary axle structure as claimed in claim 1, further comprises an outer end thereof, and the outer end disposed with an fitting end.

8. The multi-joint synchronous rotary axle structure as claimed in claim 2, further comprises an outer end thereof, and the outer end disposed with an fitting end.

9. The multi-joint synchronous rotary axle structure as claimed in claim 4, further comprises an outer end thereof, and the outer end disposed with an fitting end.

10. The multi joint synchronous rotary axle structure as claimed in claim 6, further comprises an outer end thereof, and the outer end disposed with an fitting end.

11. The multi joint synchronous rotary axle structure as claimed in claim 1, wherein the first synchronous actuating assembly and the second synchronous actuating assembly are respectively coupled to two foldable members of an electronic object.

12. The multi-joint synchronous rotary axle structure as claimed in claim 2, wherein the first synchronous actuating assembly and the second synchronous actuating assembly are respectively coupled to two foldable members of an electronic object.

13. The multi-joint synchronous rotary axle structure as claimed in claim 4, wherein the first synchronous actuating assembly and the second synchronous actuating assembly are respectively coupled to two foldable members of an electronic object.

14. The multi-joint synchronous rotary axle structure as claimed in claim 6, wherein the first synchronous actuating assembly and the second synchronous actuating assembly are respectively coupled to two foldable members of an electronic object.

15. The multi-joint synchronous rotary axle structure as claimed in claim 7, wherein the first synchronous actuating assembly and the second synchronous actuating assembly are respectively coupled to two foldable members of an electronic object.

16. The multi joint synchronous rotary axle structure as claimed in claim 1, wherein the actuating end and the link end are engaged with each other by teeth.

17. The multi joint synchronous rotary axle structure as claimed in claim 2, wherein the actuating end and the link end are engaged with each other by teeth.

18. The multi joint synchronous rotary axle structure as claimed in claim 4, wherein the actuating end and the link end are engaged with each other by teeth.

19. The multi joint synchronous rotary axle structure as claimed in claim 6, wherein the actuating end and the link end are engaged with each other by teeth.

20. The multi joint synchronous rotary axle structure as claimed in claim 7, wherein the actuating end and the link end are engaged with each other by teeth.

21. The multi joint synchronous rotary axle structure as claimed in claim 11, wherein the actuating end and the link end are engaged with each other by teeth.

22. The multi joint synchronous rotary axle structure as claimed in claim 1, wherein the actuating end and the link end are engaged with each other by frictional surfaces.

23. The multi joint synchronous rotary axle structure as claimed in claim 2, wherein the actuating end and the link end are engaged with each other by frictional surfaces.

24. The multi joint synchronous rotary axle structure as claimed in claim 4, wherein the actuating end and the link end are engaged with each other by frictional surfaces.

25. The multi joint synchronous rotary axle structure as claimed in claim 6, wherein the actuating end and the link end are engaged with each other by frictional surfaces.

26. The multi joint synchronous rotary axle structure as claimed in claim 7, wherein the actuating end and the link end are engaged with each other by frictional surfaces.

27. The multi joint synchronous rotary axle structure as claimed in claim 11, wherein the actuating end and the link end are engaged with each other by frictional surfaces.

* * * * *